(12) United States Patent
Garver

(10) Patent No.: US 6,824,109 B2
(45) Date of Patent: Nov. 30, 2004

(54) LIFT ADJUSTING DEVICE FOR AIRCRAFT

(75) Inventor: Theodore Garver, Canfield, OH (US)

(73) Assignee: E-Win Corporation, Vienna, OH (US)

( * ) Notice: Subject to any disclaimer, the term of this patent is extended or adjusted under 35 U.S.C. 154(b) by 0 days.

(21) Appl. No.: 10/283,524

(22) Filed: Oct. 30, 2002

(65) Prior Publication Data

US 2004/0084570 A1 May 6, 2004

(51) Int. Cl.[7] ................................................. B64C 23/02
(52) U.S. Cl. ....................................... 244/206; 244/130
(58) Field of Search ................................. 244/206, 130, 244/35 R, 39, 204; 416/4

(56) References Cited

U.S. PATENT DOCUMENTS

| | | | |
|---|---|---|---|
| 1,785,300 A | 12/1930 | Castelcicala | 244/206 |
| 1,796,860 A | 3/1931 | Bowers | 244/206 |
| 1,840,594 A | 1/1932 | Minor | 244/206 |
| 1,927,538 A | 9/1933 | Zaparka | 244/206 |
| 2,399,648 A | 5/1946 | Love | 244/134 A |
| 3,140,065 A | 7/1964 | Alvarez-Calderon | |
| 3,179,354 A | 4/1965 | Alvarez-Calderon | 244/206 |
| 3,488,714 A | 1/1970 | Brooks | 244/206 |
| 4,100,876 A | 7/1978 | Feleus | 244/206 |
| 4,323,209 A | 4/1982 | Thompson | 244/199 |
| 5,230,486 A | 7/1993 | Patterson | 244/199 |
| 5,803,409 A * | 9/1998 | Keefe | 244/206 |
| 2002/0179777 A1 * | 12/2002 | Al-Garni et al. | 244/206 |

FOREIGN PATENT DOCUMENTS

| | | | |
|---|---|---|---|
| CA | 2022087 | 7/1992 | |
| CA | 2134197 | 4/1993 | |
| FR | 446719 | 12/1912 | |
| FR | 614091 | 4/1926 | |
| FR | 1053332 | 2/1954 | 244/206 |
| GB | 519882 | 4/1940 | 244/134 A |

OTHER PUBLICATIONS

Barnes McCormick, "Aerodynamic aeronautics and Flight Mechanics" 1979, p. 84.*
"Publications Scientifiques Et Techniques", 1938.
"Boundary Layer Theory" Hermann Soliciting 7th Edition; McGraw–Hill, 1979.
"Fluid Dynamics of Airfoils with Moving Surface Boundary–Layer Control", J. Aircraft, vol. 25, No. 2, Feb., 1988.
"Moving Surface Boundary–Layer Control" Studies with Bluff Bodies and Application AIAA Journal, vol. 24, 1991.
"Moving Surface Boundary–Layer Control a Review", Journal of Fluids and Structures, 1997.
"Spin and Lift", The Further Inventions of Daedalus, by David E.H. Jones, Oxford University Press 1999.

* cited by examiner

Primary Examiner—Galen L. Barefoot
(74) Attorney, Agent, or Firm—Robert G. Lev

(57) ABSTRACT

The invention utilizes a computer-controlled moving band, typically on an airplane, to increase the apparent speed and therefore the lift of any body moving through a fluid. The invention will allow greater precision of control. One benefit is that take-offs and landings can be carried at reduced speeds and with greater loads. This control will also adjust boundary layer to adjust drag thereby allowing more flexibility in wing design.

18 Claims, 4 Drawing Sheets

LIFT ADJUSTING DEVICE FOR AIRCRAFT

FIELD OF THE INVENTION

The present invention relates in general to the enhanced efficiency of fluid interface surfaces such as airfoils. In particular, the present invention is directed to a dynamic mechanical system for altering lift characteristics of various fluid interface surfaces, for example those that can be used as airfoils or central surfaces on various vehicles, such as aircraft.

BACKGROUND OF THE INVENTION

Conventional prior art in this field includes basic methods of adjusting lift for fluid interface surface, such as aircraft wings. Bernoulli's Principal products lift on fluid interface surfaces based on the fact that pressure will be lower on an upper curved surface because the fluid must travel faster over the longer curved surface than a lower substantially flat surface. The result is lift, such as that found on airplane wings.

One of the key goals in aircraft design has always been increasing the lift of any aircraft. The earliest work in this field was done in the early 1920s and 1930s by an individual named Favre, who put a rotating band on a model airplane wing. However, the lower surface of the band was placed internal of the airfoil, thus eliminating the additional lift that had been expected. Additional work had been done by a Dr. V. J. Modi at the University of British Columbia, using rotating cylinders incorporated into an aircraft wing. The lower surfaces of these cylinders were not exposed as were the upper surfaces. In both instances, some increased lift, and decreased boundary layer separation were observed. However, they were not at levels that were expected and the devices were not practical. Also, precise relationships were not developed so that these early devices could not be used in practical or even model aircraft effectively.

Additional use of moveable surfaces on various parts of fluid interface surfaces have continued. Examples of more recent attempts are the techniques found in the file wrapper histories of U.S. patent application Ser. Nos. 08/893,454, 09/865,207, now U.S. Pat. No. 6,322,024, and Ser. No. 09/990,265, all incorporated herein by reference.

Other examples of conventional art use rollers to alter airfoil surface characteristics. Experiments with rotating cylinders, and their effects on boundary layer separation are disclosed in an article entitled "Moving Surface Boundary-Layer Control; A Review" published in the *Journal of Fluids and Structures*, 1997. A full review of the conventional art and its limitations is also found in the file wrapper history of U.S. patent application Ser. No. 08/893,454.

The use of rollers or rotating bands in a fluid medium has also been applied to vehicles operating in water, such as submarines. Examples of moving fluid interface surfaces applied to submarines are included in the file wrapper history of the U.S. patent application Ser. No. 08/893,454.

Lift is not the only characteristic considered with respect to rotating bands or rollers on fluid interface surfaces. Turbulence and boundary layer characteristics can also be affected. A more substantial discussion of these effects are found in U.S. Pat. No. 6,322,024, issued Nov. 27, 2001 (a continuation in part of U.S. patent application Ser. No. 08/893,454), incorporated herein by reference.

While a number of fluid interface characteristics have been observed to be adjustable by the techniques ascribed to the conventional art, there appears to be no precise relationships. There are no teachings of exact adjustments in the aforementioned characteristics, such as lift, based on changes in the rotating bands. Without specific relationships, aircraft (or other fluid medium traveling vehicles) cannot be properly designed to take advantage of the lift adjustment effected by rollers or rotating bands. The conventional art provides only the crudest guesses at the relationships between the structure of the bands or rollers, and the lift characteristics achieved thereby. Without clearly defined relationships, practical design is impossible.

Accordingly, a necessary improvement in the conventional art would include accurate relationships between the characteristics of lift enhancement devices, vehicle characteristics, environmental factors, and the effective adjustments in lift caused thereby. This would lead to the practical application of such lift adjustment devices in real aircraft or other vehicles.

SUMMARY OF THE INVENTION

Accordingly, it is one object of the present invention to overcome the limitations of conventional art airfoils.

It is an additional object of the present invention to provide a dynamic system for automatically controlling lift in vehicles moving through fluid mediums.

It is again a further object of the present invention to provide a dynamic lift control mechanism that can be used on a wide variety of structures for a wide variety of different vehicles that move through fluid mediums.

It is another object of the present invention to provide a variable lift control system for various types of vehicles moving through fluid mediums, such as air or water.

Still another object of present invention is to provide a variable airfoil configuration capable of adjusting lift characteristics responsive to the circumstances of a vehicle associated with those airfoils.

It is still another object of the present invention to provide a dynamic lift control system capable of clearing an airfoil of ice or other environmental accumulations.

It is again a further object of the present invention to provide a dynamic system capable of altering the performance of airfoil control surfaces.

It is also another object of the present invention to provide a dynamic lift system that permits aircraft to land and take off on shorter runways than is possible with conventional airfoils.

It is still an additional object of the present invention to provide a dynamic lift system that greatly enhances the lift capability of an airplane without a substantial increase in the overall cost of the airplane.

It is yet another object of the present invention to adjust drag on a fluid interface surface.

It is also another object of the present invention to provide additional control systems to increase the responsiveness of any vehicle operating in a fluid medium, in particular airplanes.

It is still a further object of the present invention to provide extremely fast, pre-programmed corrections in all phases of aircraft operation.

It is again an additional object of the present invention to provide additional lift and control devices that integrate into existing aircraft computer control systems. It is yet a further object of the present invention to provide a lift control system that limits fuel consumption.

It is still another object of the present invention to provide a relatively precise relationship between a lift adjusting mechanism, airspeed, aircraft parameters, and resulting lift so that airfoils can be designed to take advantage of the characteristics of the lift adjustment device.

It is yet a further object of the present invention to provide a lift adjustment system having sufficient precision to facilitate exact computer control of an aircraft employing the lift adjustment system.

It is again an additional object of the present invention to provide a lift control system that is capable of substituting for many of the operations of aircraft flaps.

It is still a further object of the present invention to provide a lift control system which can provide an amount of additional lift that is not decreased by the angle of attack of the airfoil on which the device is placed.

It is yet another object of the present invention to provide a lift control system that is capable of creating additional force on the underside of an airfoil.

It is still a further object of the present invention to provide a lift system that is capable of adding significant lift to miniature aircraft, such as unmanned aircraft vehicles (UAV).

It is yet an additional object of the present invention to provide a lift control device that is particularly applicable for low speed operation such as landings and takeoffs.

It is still another object of the present invention to provide a lift control device configured so that the lift provided increases with the size of the lift control device.

It is again a further object of the present invention to provide a lift control device constituted by a rotating band on an airfoil, without the necessity of a motor to rotate the band.

It is still a further object of the present invention to provide a lift control device capable of controlling boundary layer separation.

It is yet an additional object of the present invention to provide a lift control system that allows airfoil designs, which result in decreased turbulence.

It is still a further object of the present invention to provide a lift device which increases lift as the speed of the vehicle, on which the device is attached, is increased.

It is again another object of the present invention to provide a lift device which increases lift as the speed of the surface moving over a wing or other surface is increased.

These and other goals and objects of the present invention are accomplished by an airfoil configured to provide lift. In addition to lift resulting, from the airspeed on the airfoil, including a moving device for incrementing lift, having a rotation speed so that a change in lift is proportional to the square of the rotation speed of the moving device.

Another embodiment of the present invention includes an airfoil having at least one movable band arranged around an upper surface and lower surface of the airfoil. Changes in lift of the airfoil are incremented in accordance with the relationship: $\Delta L \propto (RS_l)^2 - (RS_u)^2$; where $\Delta L$ is a change in lift; $RS_l$ is a relative speed of a lower portion of the band on the lower surface of the airfoil, and is equal to $S_b + S_a$; where $S_a$ is the airspeed and $S_b$ is the band speed; and, $RS_u$ is a relative speed of an upper portion of the band on an upper surface of the airfoil, and is equal to $S_b - S_a$.

Another manifestation of the present invention is found in a method of controlling lift of an airfoil with a moving lift control device. The method includes the steps of developing airspeed on the airfoil, and developing rotational speed of the moving lift control device so that the change in lift is proportional to the square of the combination of airspeed and rotational speed of the moving lift control device.

A further manifestation of the present invention is found in an aircraft having at least one airfoil and a moving device for simulating aircraft flap operation to adjust lift and drag. The moving device includes at least one movable band contoured around at least a portion of at least one of the airfoils.

Another manifestation of the present invention is found in a fluid interface surface configured to provide lift in addition to lift resulting from the fluid speed on said interface surface. The fluid interface surface includes a moving device for incrementing lift. The moving device has a rotational speed operating so that a change in lift is proportional to the square of the rotation speed of the moving device.

Yet another version of the present invention is manifested by a miniature aircraft suitable as a model, or as a UAV. This miniature aircraft has at least one airfoil configured to provide lift in addition to lift resulting from airspeed on the airfoil. The airfoil includes a moving device for incrementing the lift. The moving device has a rotation speed so that a change in lift is proportional to the square of the rotation speed of the moving device.

DETAILED DESCRIPTION OF THE INVENTION

The present invention substantially increases the lift caused by the flow of fluid on a fluid interface surface such as an airfoil. The present invention includes a band which travels around the fluid interface surfaces, such as airfoils, in a manner which causes the lift to be equivalent to that of a vehicle that is traveling faster than the actual speed of the vehicle. Because the amount of lift is proportional to the square of the apparent speed or band speed, the increase in lift can be very substantial.

The inventive system disclosed is primarily for increasing the lift or upward force in bodies moving through a fluid. However, the present invention can be used to adjust drag or boundary layer separation. The device has primary applicability to aircraft, but also has applicability to any other body moving through a fluid medium, and so includes watercraft and land vehicles.

The inventive system can increase the lift of an airplane wing by creating a greater apparent airspeed on a moving band than exists, on the wing alone. The inventive system includes a moving surface that is itself attached to a body, such as an aircraft wing, which is moving through the fluid. The moving surface is generally described as a band herein, but may be any surface which moves relative to the vehicle or body to be lifted. The band moves in such a manner that its upper surface travels in the opposite direction to the direction of travel of the vehicle relative to the fluid and the lower surface of the band travels in the direction of the movement of the vehicle relative to the fluid medium. The upper surface of the band is therefore moving in the same direction as the fluid flow relative to the vehicle, and the lower surface of the band is moving in opposition to the fluid.

Figure 1:
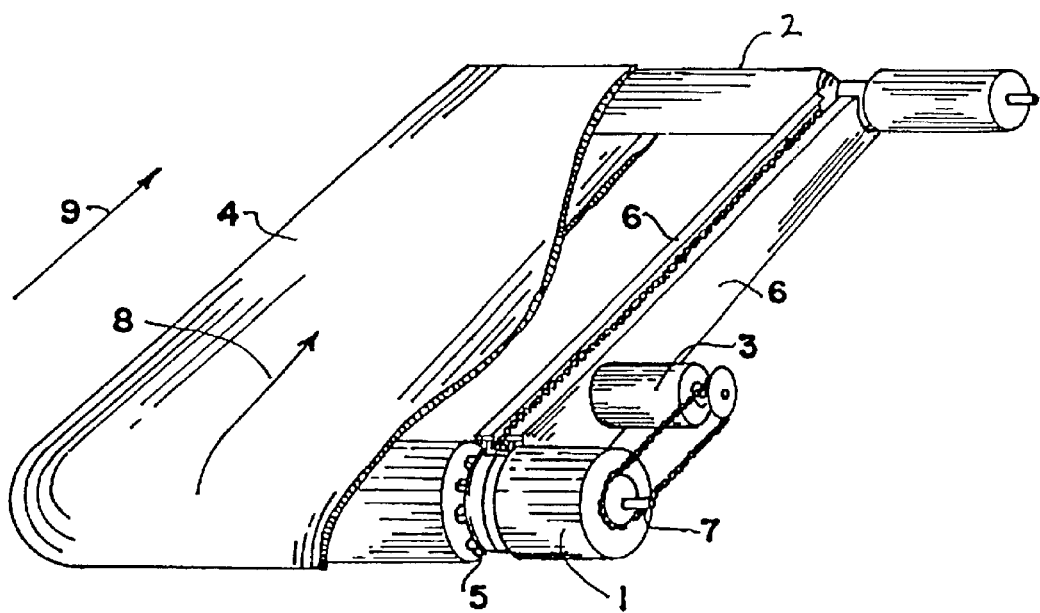
FIG. 1 is cut away perspective view depicting one embodiment of the moving band included in the present invention.

FIG. 1 depicts a cutaway view of the invention not connected to the vehicle to be lifted. The moving band 4 is shown traveling on rollers 1, 2, and driven by a power source 3. Element 1 is the lead (powered) roller on which the band rides. Element 2 is an idler rear roller. Element 3 is the power source, preferably an electric motor, to drive the rollers. Element 4 is the band itself and is made of a light durable material having high tensile strength. Element 5 is an unspecified drive mechanism for the rollers. Element 6 is an unspecified guide track to keep the band in place. Element 7 is an axel for the roller 1. Vector 8 indicates the direction of movement of the upper surface of the invention. This is the same direction as airflow Vector 9.

While the motivating means and mechanisms for moving and controlling the moving band are indicated as being unspecified, such devices are certainly not unknown. Rather, anyone with any skill in the mechanical arts and aviation control would be able to transmit power from the main engines of the aircraft to a wing motivator. One motivation system would include the use of electric motors 3 mounted in the wing to operate the rollers 1, 2 that control the moving bands 4. Virtually any kind of mechanical motivator that can be arranged in an aircraft wing or used for transmitting power to the wing could be used. So, while an electric motor might be used, any number of motivating systems can be applied within the concept of the present invention. A preferred motivation system would include a fluid hydraulic drive.

Figure 6:
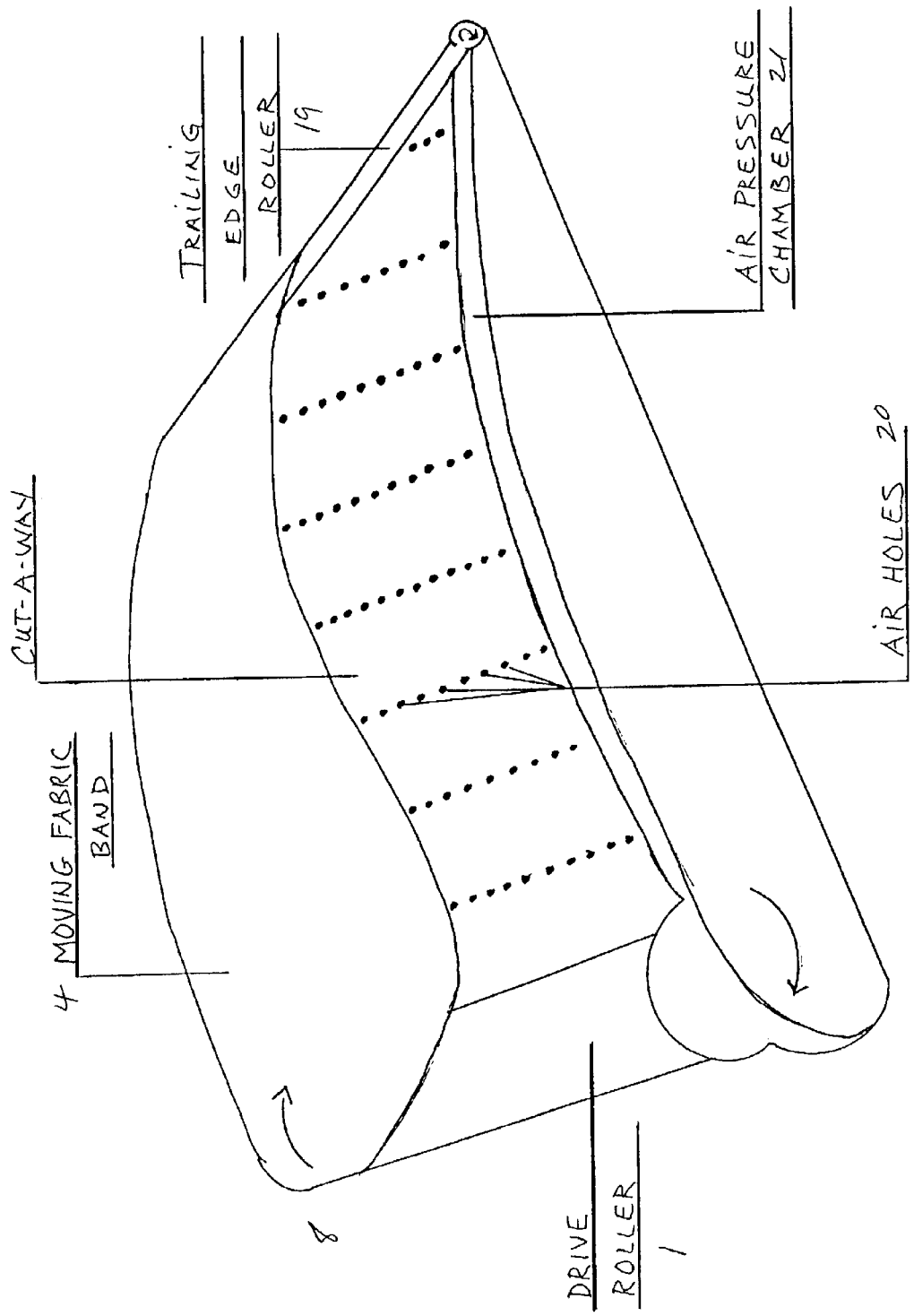
FIG. 6 is a perspective view of an aircraft wing employing an alternative means for operating the lift adjustment system of the present invention.

FIG. 6 depicts an alternative arrangement for driving the moving band 4. Beneath the band is a series of air holes 20 which spend pressurized air by it so that the band moves in the proper direction as depicted by vector 8. The drive roller 1 and the trailing edge roller 19 are not powered at all so that the arrangement of FIG. 1 is unnecessary. However, both rollers must be sufficiently loose so that they do not constitute a hindrance to the movement of moving band 4. The airholes 20 are supplied from a pressure chamber 21 immediately beneath the structure of the wing through which the airholes are formed. The airholes can be biased or sequenced in a manner known to those skilled in the art of air pressure manipulation so that the band can be moved in the direction depicted by vector 8, stopped, or even reversed if the operator so desires. The advantage of the arrangement of FIG. 6 is that expensive electric equipment is not needed and complicated mechanical transmission trains can also be eliminated. All that is required is a simple compressor preferably in the fuselage of the plane and at least one feed line for the compressed air. A single line will take up very little space and is simple to install and operate. In the alternative, a plurality of airlines can be run so that separate holes or series of holes are controlled separately. Because there is no mechanical transmission chain or electric motors involved, the embodiment of FIG. 6 may be easier to use as a retrofit than the embodiment of FIG. 1.

Figure 2:
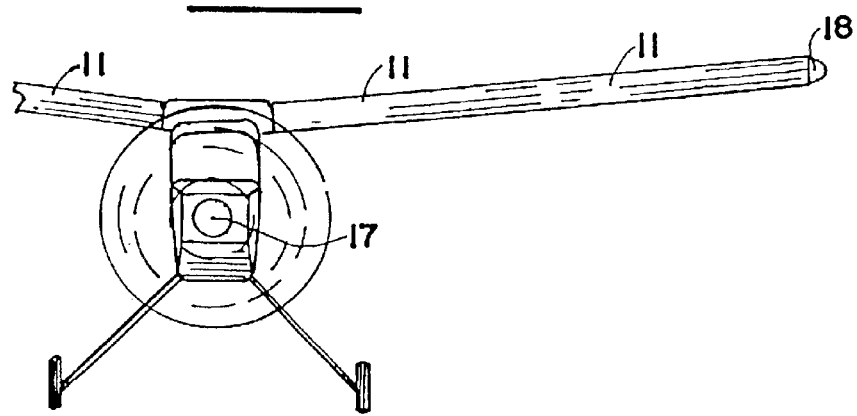
FIG. 2 is a front view of an airplane equipped with the present invention.

FIG. 2 depicts an airplane equipped with the present invention. Element 11 includes a unit of the invention mounted on the wing. Element 17 is a conventional propeller shaft. Element 18 is the stationary wing tip which does not incorporate the invention. It should be noted that the moving band of the present invention conforms with the shape of the airplane wing so that it is virtually indistinguishable from the wing when seen head-on, as depicted in FIG. 2. The advantage of the rotating bands used in the preferred embodiment of the present invention, over the conventional use of rollers (as depicted in a number of examples of the conventional art), is that the exact shape and full advantages of the wing can be maintained or modified as desired.

Figure 3:
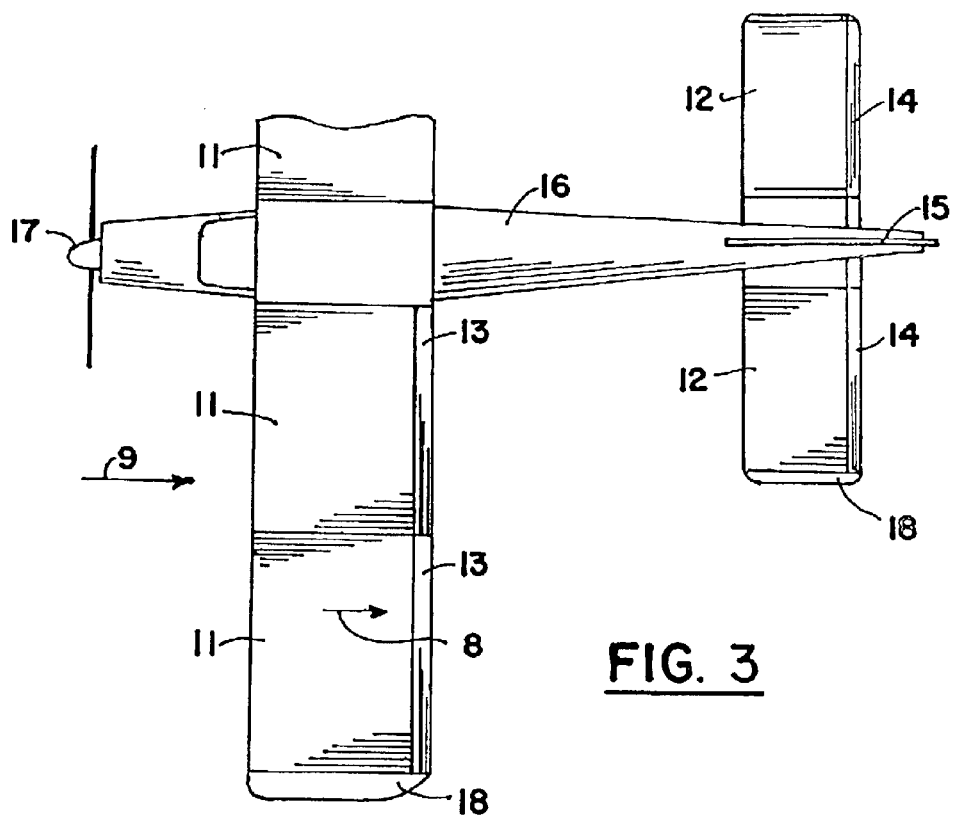
FIG. 3 is a top view of the airplane of FIG. 2, depicting the application of the present invention to both the wings and the rear elevators.

FIG. 3 depicts the top view of the airplane shown in FIG. 2. Vector 8 indicates the direction of the band movement, and vector 9 indicates the direction of the airflow relative to the aircraft. Element 11 is the wing unit of the invention and Element 12 is a similar tail unit. Element 13 is the wing surface control (flap) located behind the invention, and Element 14 is a similar tail surface control. Element 15 is the upright section of a conventional airplane tail. Element 16 is a conventional airplane fuselage. Element 17 is a propeller shaft and Elements 5, 18 are the wing tips extending beyond the invention.

Figure 4:
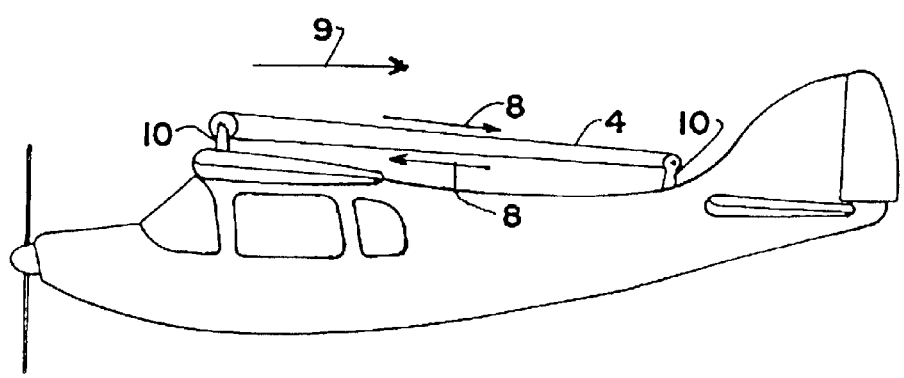
FIG. 4 is a side view of a plane employing another embodiment of the present invention.

FIG. 4 depicts another embodiment of the invention, mounted on the top of the fuselage of an airplane. In practice the invention in this configuration would probably be exposed only during take-off and landing and folded into the body of the plane during flight as a landing gear is now operated. Element 4 is the moving band. Vector 8 shows the direction in which the band is moving. Vector 9 shows the direction in which the air is moving in relation to the aircraft. Element 10 is a bracket structure for attaching the invention to the airplane.

Because the band speed is added to the speed of the wing, the lift forces are equivalent to the lift associated with a substantially greater speed than the actual speed of the airplane. The simplest embodiment of the invention is as shown in FIGS. 2 and 3 with the invention incorporated into an airplane wing, but the invention is not confined to such a configuration, nor to airplanes. The invention can also be placed in a separate pod suspended below an aircraft wing. It can also be placed above the fuselage as depicted in FIG. 4, and might have to be placed on the tail sections in order to balance the upward thrust of a similar device on the wing. The invention can also be incorporated into or attached to a watercraft or land vehicle in any number of different configurations.

In conventional aircraft the principles of fluid mechanics are employed to cause lift by making the upper surface of the wing convex so that the air must move faster over it than over the bottom surface. A second factor in creating lift is the attitude or angle of attack. The lift provided by the present invention is not affected by the angle of attack.

Conventional aircraft have wings with a convex upper surface and a positive angle of attack. Both of these factors cause turbulence because of the tendency of the air or other fluid to curl around the raised part of the surface. The swirling of the air around the raised surface is the principle turbulence encountered in aircraft. The present invention enables wings to be used with flat or nearly flat surfaces in order to greatly reduce or eliminate these conditions and therefore reduce turbulence. The reduction in turbulence will, in turn, increase efficiency and reduce fuel costs. Wing design can also be simplified.

Additionally an aircraft wing is subject to a phenomenon known as "boundary layer separation" which is the detachment of the layer of air from the wing surface. All lift to the rear of this detachment is lost, in extreme cases resulting in "stall". The invention greatly reduces and in some circumstances eliminates boundary layer separation. Since the present invention controls boundary layer separation, it can also be used to increase the boundary layer, thereby serving the function of a flap. This can be especially important for low speed operation during landings and takeoffs. Because of this capability, use of the present invention can conceivably be used to eliminate flap structures all together.

The effectiveness of the invention is dependent upon the motion of the airplane or other body, or, in some instances upon the motion of the air or other fluid against the body to be lifted. In all circumstances the effect of the invention is only to multiply motion that is otherwise present. It will not lift as a helicopter, but will allow slower take-offs and landings, on shorter runways, using less fuel than for comparable aircraft without the present invention.

Another embodiment similar to that shown in FIGS. 2 and 3 is configured so that the invention is contained partially within the wing or tail, only to the extent that it does not form the trailing edge of the wing or tail. The invention may also be used in a manner so that it does not form the leading edge of the wing. Likewise, the present invention can be configured in a manner that it does not form either the leading edge or trailing edge of the wing or tail.

One advantage of using a rotating band on the fuselage or some other large area is that the lift increases proportionately with the increased area of the moving band. This characteristic will then lead to a wide range of interesting uses for the present invention in situations where a large rotating band can be easily deployed. For example, a small electric motor can provide additional control of many kinds of aircraft, such as gliders. Wide areas of band deployment may also be practical on large land vehicles so that lift and drag could be controlled to enhance the vehicle's operating efficiency.

Based upon tests conducted in a wind tunnel, it has been discovered that most lift is achieved when the bottom portion of the band is exposed, rather than the top portion. However, for ease of wing construction, and to utilize the full control potential of the rotating band, the first preferred embodiment of the present invention requires that the rotating band be exposed above and below the wing of the aircraft.

The variation depicted in FIG. 4 can be used either as original equipment or as a retrofit on existing aircraft. This embodiment (as the other embodiments) may or may not contain a mechanism which will allow the invention to be withdrawn into the body of the airplane during level flight as landing gear are now often withdrawn. A very similar embodiment (not shown) would be to create a structure to hang under the wing with the band moving around the hanging structure. Of course, standard aircraft wings can be retrofitted to include the rotating bands of the present invention, in virtually any of the configurations previously discussed. Depending upon the size and the type of the aircraft, the material of the rotating bands can be anything from canvas, to mylar, to pre-stressed metal such as titanium, aluminum or steel. Retrofitting lightweight aircraft such as drones will be especially easy due to the availability of lightweight band material and miniature motors of mechanical transmission systems. Further areas where retrofitting could be particularly advantageous would include high-speed water aircraft, such as hydroplanes, in which fine balance must be maintained between lift and drag. The additional control provided by the use of a rotating band at various points on the craft using a hydroplane, will provide an extra measure of safety.

In another embodiment (not shown, but similar in concept to that of FIG. 4) the band is placed on the fuselage of the plane, an area previously little used to provide lift. The band penetrates the top of the fuselage so that the top of the band is not exposed to the wind, but instead is enclosed in the airplane. This configuration allows a less acute angle or larger radius of the rotor driving the band, which will, in turn allow less flexible materials to be used. This bottom of the band can be exposed on the bottom of the fuselage( or conceivably a single band going through the entire fuselage). As with the other embodiments the speed of the band should be controlled and the power can be derived either from an independent motor or from the engine of the airplane.

The speed of one or more of the bands can be varied, and the speed controlled by means of a computer. Changes in velocity of the moving band will consequently alter the additional lift provided to the wing or airfoil. Also, the use of rotating bands on wings, flaps, elevators, and ailerons provides an effective mechanism for controlling and otherwise reducing ice formation on critical surfaces.

Other embodiments of the present invention can be used in either land or water vehicles. For water vehicles, in particular, the present invention can be used to enhance the effectiveness of control surfaces. For land vehicles, the aerodynamic capabilities of critical surfaces (either control or lifting) can be improved by the application of the present invention, thereby increasing the speed and efficiency of the vehicle. Accordingly, application of the present invention will be particularly useful in racing vehicles. However, the present invention is not limited thereto. Rather, the present invention can be applied to optimize the aerodynamic surfaces of large trucks, thereby increasing fuel efficiency.

When using computer control for the present invention, particularly as applied to aircraft, each airplane wing could have more than one band, each separately controlled by its own computer. This arrangement would allow redundancy in the event of failure in any one continuous moving band or its control system. The speed of each band could be controlled using ultra-fine adjustments made possible by the use of computer or a microprocessor. These adjustments can be made rapidly, in response to changing flight conditions, either as detected, or as input by the pilot.

One benefit of computer control using the present invention would be the capability of allowing changes in angles of climb or descent, much like the use of wing flaps. However, unlike wing flaps, the moving belts would make possible steeper angles of climb and descent than would be possible with conventional flaps.

Computer control would also permit a faster response to climatic conditions, which require quick adjustments in the aircraft. The present invention would be particularly useful in case of severe conditions, such as a microburst encounter. A microburst is a concentrated severe downdraft induces an upburst of damaging winds at the earth's surface, and has a maximum horizontal extent of approximately 2.2 miles. Microburst encounters can be devastating unless the plane is quickly and efficiently adjusted in response thereto. This is particularly difficult with conventional airplane controls but would be easily facilitated using the fast adjustments provided by computer control of rotating bands.

Computer control of the rotating bands is particularly useful during other types of turbulence encounters. In particular, computer control of the rotating bands could reduce or dampen rolling tendencies, thus resulting in smoother flights. Reducing the roll could be accomplished through differential computer control of moving bands on different wings and/or the same wing. A band near the wing tip would produce a greater arresting rolling moment than a band near the fuselage. Differential control of these bands could permit rapid and fine adjustment of the aircraft.

Computer control of the bands on the horizontal stabilizer would also provide pitch control as well as additional means for roll control. Bands moving in the same direction will moderate pitch while bands moving in opposite directions on opposite sides of the plane (such as moving in opposite directions on the left and right horizontal stabilizers) can provide a device responsive to control roll. Undesirable yaw due to turbulence can also be corrected by moving bands on the vertical stabilizer.

Figure 5:
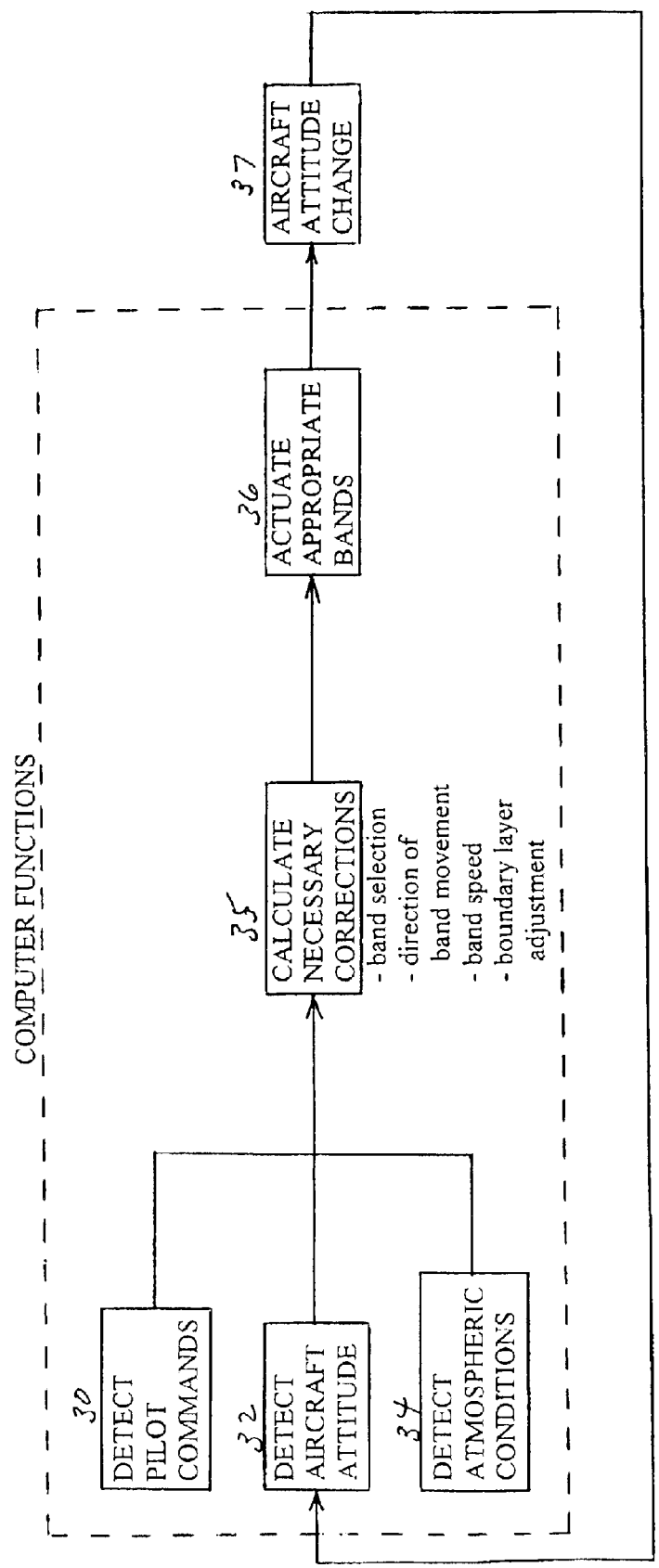
FIG. 5 is a flow diagram depicting computer controlled operation of an aircraft using the lift adjustment system of the present invention.

Computer control of the moving bands would supplement an airplane's existing stability and control augmentation system (SCAS). As a result, the computer control of the moving bands would of necessity become part of the SCAS. In operation as depicted in FIG. 5 when the pilot moves the controls (step 30), such as the yoke or rudder peddles, the appropriate hydraulic actuators are activated. These in turn move the corresponding control surface (ailerons, the elevator and the rudder). The pilots control input is also sensed by a transducer which sends an electrical signal to the SCAS computer. This computer then transmits a signal to the appropriate electrically powered servo-control device which moves the hydraulic actuator and ultimately the control surface.

There can also be a full set of environmental sensors to detect wind speed, altitude, attitude, direction, pitch, roll and the like. A disturbance, due to turbulence for example, alters one or more of the aforementioned parameters. Such a disturbance would cause an error signal to be sent to the SCAS computer which would automatically command an appropriate control surface corrective movement by means of signal to a hydraulic servo-valve and/or a moveable band motor drive. The moveable bands could be adjusted to a very fine level of control in order to make the necessary correction in the flight of the aircraft. Consequently, in one preferred embodiment of the present invention, the control of the moveable bands is to be integrated with the SCAS computer to provide an enhanced level of control to the aircraft.

A wide variety of flight parameters can be programmed into just the computer controlling the moving bands by themselves (as depicted in FIG. 5), or into an integrated version of moving band control within the SCAS computer. In one example, information is taken from instruments detecting the following parameters (a) airspeed; (b) proximity to the ground; (c) pitch; (d) yaw; (e) angle of attack (all at step 32); (f) air density parameters such as temperature, pressure and humidity; and, (g) crosswinds. It should be noted that this list is not exhaustive of all parameters that can be detected and entered into the system, but is merely exemplary of how such a system could work.

In operation the pilot would enter flight commands such as the desired rate of climb. This could be done through a computer input or merely by an adjustment of the standard airplane controls, such as the yoke and power controls. The computer for the moving bands would then calculate the necessary band speeds of each band in order to correct pitch or yaw. The computer would also calculate the band action needed to minimize the crosswind effect. This would be provided to this SCAS computer which would integrate the band control data with data for other control devices. Then, the SCAS computer would calculate the necessary band speeds to achieve the desired rate of climb in conjunction with other control operations.

Once all calculations have been carried out, the SCAS computer relays information to the left and right controls (not shown) or the band mechanisms, which control the drive bands at the pre-calculated speeds. The SCAS computer continues to receive data regarding the various flight parameters to calculate additional adjustments as they become necessary.

It should be understood that many flight parameters will change drastically between low attitude and high attitude operation. Further, flight parameters will also change drastically when in the process of landing or taking off. Consequently certain parameters, such as angle of attack and proximity to the ground become especially crucial at these times.

On the other hand, at higher altitudes, temperature, pressure and humidity often become crucial, especially with regard to icing of the wings. For example, if the temperature drops below the dew point and below the freezing point, the computer will direct short bursts of band activity at preprogrammed intervals in order to remove the ice. The use of the computer control can carefully regulate the amount of band motion to that which is appropriate for the ice that is forming.

Computer control of the rotating bands also permits precise adjustments in all of the flight parameters that can be controlled by the rotating bands. These include lift, drag and boundary layer separation.

It has already been well demonstrated that there are many flight control situations in which the precision of computer control is absolutely necessary. The handling of the control surfaces of the Space Shuttle is only one example. While not appropriate for the Space Shuttle, the additional precision control provided by the present invention will be useful in a wide range of other flight control applications.

The present invention relies upon the application of standard fluid dynamic principles in a new manner, providing an additional set of flight parameters to control lift, and otherwise control aircraft. The tests that were used to improve the operation Of the present invention and the relationships derived there from are found in Appendix I, attached hereto. While the tests performed were in a wind tunnel, in a device suitable as a conventional drone or model, principles are the same as the scale increases or decreases. Thus, the present invention can work on a miniscule model as well as a full-size conventional aircraft. Further, since these principles apply to water (or any other fluid), as well as air, the same advantages can be achieved, and the same relationships can be applied to vehicles in any liquid medium. Further, since the principles uncovered with respect to the present invention will also apply to any situation in which a vehicle is passing through air, the applications of the present invention need not be limited to aircraft. Any aerodynamic control surface on any vehicle can obtain the benefits of the present invention, both for controlling lift and drag in accordance with the following relationships.

The preferred embodiment of the present invention includes a rotating band on the airfoil or control surface. The rotating band has a speed which is independent of that of the vehicle moving through the fluid medium (air, water, or the light). The amount of lift added to the vehicle is proportionate to the square of the rotation speed of the moving band. When testing the present invention, as indicated by the results of Appendix I, the following relationships were operating in the present invention were developed:

$$\Delta L \propto (RS_l)^2 - (RS_u)^2;$$

where $\Delta L$ is a change in lift; $RS_l$ is a relative speed of a lower portion of the band on a lower surface of the airfoil, and is equal to $S_b + S_a$; where $S_a$ is airspeed and $S_b$ is band speed; and, $RS_u$ is a relative speed of an upper portion of the band on an upper surface of the airfoil, and is equal to $S_b - S_a$.

It is worthwhile to note that the greater increase in lift occurs at the point where the existing theory of fluid mechanics would predict that no lift occurs at all. This is when the band speed is substantially equal to the airspeed so that there is no relative motion between the air and the band on the upper surface of the wing. With no such relative motion, both Bernoulli's principle and other existing lift theories involving boundary layers, predict no lift at all. At the same time, the lower surface of the band would be expected to cause a downdraft, and thus, a loss of lift under Bernoulli's principle. In contrast, the experiments, as indicated in Appendix I, appear to demonstrate a lifting force that has not been previously identified.

By controlling both drag and lift the present invention can operate to the same effects as conventional flaps. Almost all conventional airplanes have flaps. These are essentially the trailing edge of the wing, separated from the rest of the wings so that they can be manipulated. When a flap is aligned with the rest of the wing its function is no different than that rest of the wing. The key operation of the flap is that it can be put in the "down" position in order to give the plane additional lift and to cause additional drag. Since drag is helpful in landings, planes are almost always landed in the "flaps down" position. Also, to obtain additional lift, most airplanes take off in the "flaps down" position.

The experiments conducted with the present invention have uncovered a relationship between drag, airspeed, and band speed, which is essentially a straight line relationship but much lower than the amount of increase for the lift for the same speeds. For example, at a thirty mile per hour band speed, the lift showed an increase of about two and a half pounds as the airspeed was increased from thirty-six miles to fifty-six miles per hour. On the other hand, the increase in drag was less than one pound under the same conditions. Thus, with the present invention, the effects of drag can be easily upset by the substantially greater increase in lift. Thus, to a substantial extent, the present invention can substitute for flaps. The interrelationship between the operation of flaps and that of the present invention, when both are used is relatively complex. The relationship will depend upon a number of factors, including: the shape of a flap; the distance of the flap from the body of the wings; the angle of attack of the flap; and the proximity of the aircraft to the ground.

All airplanes in motion have a boundary layer of air that sticks to some degree to the surface of the wing. A major issue, particularly with high performance aircraft, is boundary layer separation. That is the detachment of the boundary layer from the surface of the wing. This separation causes a lost in lift and in extreme cases will cause a crash. A separation starts at the trailing edge of a conventional wing as the speeds or angle of attack becomes great enough so that the air flow is not able to remain attached to the wing. The airflow pulls the boundary layer away, and lift is lost. In the operation of the present invention the movement of the band reduces the tendency of that part of the boundary layer that has the greatest tendency to separate by moving it out of the air stream quickly. In effect, the movement of the band reduces the relative airspeed between the airfoil and the air stream. Since airspeed is one of the main factors causing boundary layer separation, the tendency to separate is thereby reduced. This has been observed in experiments using smoke to indicate the movement and configuration of the boundary layers.

The tests referred to in Appendix I were performed on a model with a surface area of 708 square inches at relatively low airspeeds, reflected by relatively low band speeds. Accordingly, it is recognized that the present invention is particularly efficacious for models or drones which operate at low speeds for long periods of time. It should also be recognized that the tests can be scaled up to larger airfoil surfaces as long as the ratio of distance from the leading edge to trailing to the length of the trailing edge remains constant. In the case of the tests this ratio was twenty nine and one half (29½) inches to twenty four (24) inches. If this ratio is changed, the amount of increased lift will change incrementally, but the invention will still create greater lift and drag than is found on a normal airfoil.

Tests were generally run between five miles an hour and fifty miles an hour for the airspeed. Band speeds also varied between these ranges during the tests. Tests indicated that the present invention would be particularly effective on slow-moving aircraft, such as drones or model planes, which operate at low speeds. The use of the present invention would allow drones to operate at even lower speeds than they do now while still maintaining the desired lift and altitude. Since the operation of the present invention is scalable, the present invention would be effective for much higher speeds. However, the present invention is particularly effective for the range of speeds in which drones normally operate, from approximately 10 miles an hour to approximately 200 miles an hour.

The effects of the present invention can be scaled up indefinitely if the area of the moving band is doubled, the lift of the moving band can also be doubled. In scaling up the invention, it is not necessary to consider only the wing surface. For example, a structure can be placed on the top of the fuselage to hold one or more bands. This will allow greater surface area for greater lift. In all probability, this structure would be retractable in a way similar to retractable landing gears. Other arrangements could also be used within the concept of the present invention.

In applying the present invention to actual airplane configurations, there is some difficulty because many modem airplanes have swept-back wings and the invention is designed for a band to run in the same direction as the air stream. There are a few ways to solve this problem. The most direct is to simply replace the wings with wings that are not swept-back. In this case, the results of the test can be applied to that adjustment. The second suggestion is to let the moving bands move perpendicular to the wings' leading edge. In such a case, the added lift will be reduced by the ratio of the swept-back angle to ninety degrees. For instance, if the wing is swept back ten degrees the added lift would be reduced by 10/90 or 1/9. A third solution is to skew the placement of the invention so that it will be parallel to the actual airstream. In such a case, the results of the relationships between lift and band speed could apply without adjustment. It should also be noted that each type of wing design will have different lift characteristics, so that in all cases, the lift will have to be determined in relation to the particular airfoil involved using the present invention.

Although a number of embodiments of the present invention have been provided as examples, the present invention is not limited thereby. Rather, the present invention should be construed as encompassing any and all variations, permutations, modifications, adaptations and embodiments that would occur to one skilled in the arts of fluid dynamics and airplane design, once taught the present invention by this application. Accordingly, the present invention should be limited only by the following claims.

I claim:

1. An airfoil having at least one movable band is arranged on an upper surface and a lower surface moving from a front portion to a rear portion of said airfoil, said at least one available band being part of means for controlling changes in lift of said airfoil in accordance with the relationship:

$$\Delta L \propto (RS_1)^2 - (RS_u)^2;$$

where $\Delta L$ is a change in lift; $RS_1$ is a relative speed of a lower portion of said band on a lower surface or said airfoil, and is equal to $S_b + S_a$, where $S_a$ is airspeed and $S_b$ is band speed; and, $RS_u$ is a relative speed of an upper portion of said band on an upper surface of said airfoil, and is equal to $S_b - S_a$, whereby lift increases by front to rear movement of said upper surface of said movable band.

2. The airfoil of claim 1, wherein said movable band operates responsive to environmental conditions to reduce ice formation of said airfoil.

3. The airfoil of claim 2, wherein at least a portion of said at least one movable band is arranged within an interior of said airfoil.

4. The airfoil of claim 1, wherein said means for controlling changes in lift comprise a plurality of movable bands.

5. The airfoil of claim 4, wherein said plurality of said movable bands are driven by compressed air exiting a plurality of apertures in at least one surface of said airfoil.

6. A method of controlling lift of an airfoil with means for controlling lift, comprising the steps of:

a) developing airspeed on said airfoil; and, b) developing rotational speed from a front portion to a rear top portion of said airfoil so that said means for controlling lift operates in accordance with the relationship:

$$\Delta L \propto (RS_1)^2 - (RS_u)^2;$$

where $\Delta L$ is a change in lift; $RS_1$ is a relative speed of a lower portion of said band, and is equal to $S_b + S_a$, where $S_a$ is airspeed and $S_b$ is band speed; and, $RS_u$ is a relative speed of an upper portion of said band, and is equal to $S_b - S_a$; and, c) generating control signals based upon airspeed.

7. The method of claim 6, wherein said means for controlling lift comprise a plurality of movable bands arranged along said airfoil.

8. The method of claim 7, wherein said plurality of movable bands are independently driven.

9. The method of claim 7, wherein said plurality of movable bands are driven by pressurized air being injected from a plurality of apertures on at least one surface of said airfoil.

10. The method of claim 9, further comprising the steps of:

d) altering said speed of said moving lift control device responsive to detected airspeed of said airfoil; and, e) recalculating a value of lift achieved by said moving lift control device to be used in further calculations.

11. The method of claim 10, wherein said speed of said means for controlling lift functions responsive to other environmental conditions and instructions from an operator of said airfoil.

12. A miniature aircraft suitable for use as a model and a drone, having at least one airfoil configured to provide lift from airspeed on said airfoil, said miniature aircraft comprising:

(a) moving means for controlling lift, said moving means having a rotation speed from a top front portion of said airfoil to a top rear portion of said airfoil so that a change in lift is, whereby movement of said moving means from top front to top rear controls lift in accordance with the relationship:

$$\Delta L \propto (RS_1)^2 - (RS_u)^2;$$

where $\Delta L$ is a change in lift; $RS_1$ is a relative speed of a lower portion of said band, and is equal to $S_b + S_a$, where $S_a$ is airspeed and $S_b$ is band speed; and, $RS_u$ is a relative speed of an upper portion of said band, and is equal to $S_b - S_a$.

13. The miniature aircraft of claim 12 wherein a ratio of distance from front edge to a rear edge of said airfoil to a length of a rear edge of said airfoil is substantially 29½:24.

14. The miniature aircraft of claim 12, wherein said miniature aircraft is configured to operate at speeds as low as twenty miles per hour.

15. The miniature aircraft of claim 12 wherein lift on said airfoil increases proportionately with an increase in an area of said moving means.

16. The miniature aircraft of claim 12 wherein increased operation of said moving means compensates for decreased convex curvature of said airfoil.

17. The miniature aircraft of claim 16, wherein said moving means and curvature of said airfoil operate in conjunction to reduced turbulence.

18. The miniature aircraft of claim 12, wherein said moving means is retrofit to said airfoil.

* * * * *